United States Patent
Reinisch et al.

(10) Patent No.: US 11,749,019 B2
(45) Date of Patent: *Sep. 5, 2023

(54) SYSTEMS AND METHODS FOR MATCHING FACIAL IMAGES TO REFERENCE IMAGES

(71) Applicant: The Code Dating LLC, New York City, NY (US)

(72) Inventors: William Reinisch, New York City, NY (US); Stacy Meredith Schneider, New York City, NY (US); Charles Anthony Sankowich, New York City, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/647,079

(22) Filed: Jan. 5, 2022

(65) Prior Publication Data

US 2022/0130172 A1    Apr. 28, 2022

Related U.S. Application Data

(63) Continuation of application No. 17/410,731, filed on Aug. 24, 2021, now Pat. No. 11,263,436.

(60) Provisional application No. 63/071,071, filed on Aug. 27, 2020.

(51) Int. Cl.
G06V 40/16    (2022.01)

(52) U.S. Cl.
CPC .......... *G06V 40/168* (2022.01); *G06V 40/172* (2022.01)

(58) Field of Classification Search
CPC .. G06V 40/168; G06V 40/172; G06V 10/764; G06V 40/16
See application file for complete search history.

(56) References Cited

U.S. PATENT DOCUMENTS

| 7,684,651 | B2 | 3/2010 | Tang |
| 8,812,519 | B1 | 8/2014 | Bent |
| 8,903,198 | B2 | 12/2014 | Datta |
| 9,733,811 | B2 | 8/2017 | Rad |
| 10,810,403 | B2 | 10/2020 | Frolovichev |
| 11,263,436 | B1 * | 3/2022 | Reinisch ............. G06V 40/172 |
| 2018/0276245 | A1 | 9/2018 | Shochat et al. |

(Continued)

OTHER PUBLICATIONS

Brittany Levine Beckman, "What Will Online Dating Be Like in 2030?", dated Feb. 14, 2019, webpage printed on Oct. 5, 2021 from: https://mashable.com/article/future-online-dating, in 11 pages.

(Continued)

*Primary Examiner* — Phuoc Tran

(57) ABSTRACT

A facial feature matching system comprises a facial feature matching engine. A first user selection of reference facial images is received, and facial features of reference faces are characterized using the facial feature recognition engine comprising a neural network with input, hidden, and output layers. The facial features are weighted. The weighted facial features are used to identify users that have facial features similar to the weighted facial features, wherein the respective reference faces include faces different than the faces of the users. Similarity indicators are generated for the identified users. The generated respective similarity indicators are used to generate a ordering of the identified users which is rendered via the user device. A first user selection of a second user in the ordered identified users is received and the first user and the second user are enabled to communicate over an electronic communication channel.

21 Claims, 7 Drawing Sheets

(56) References Cited

U.S. PATENT DOCUMENTS

| | | | |
|---|---|---|---|
| 2020/0057855 A1 | 2/2020 | Shear et al. |
| 2020/0184278 A1 | 6/2020 | Zadeh et al. |
| 2020/0372243 A1 | 11/2020 | Tai et al. |
| 2021/0209184 A1 | 7/2021 | Huang et al. |
| 2021/0209607 A1 | 7/2021 | Xu |
| 2021/0264135 A1 | 8/2021 | Whitelaw et al. |
| 2021/0271356 A1 | 9/2021 | Debnath et al. |
| 2021/0302621 A1 | 9/2021 | Brown |
| 2021/0306607 A1 | 9/2021 | Koch et al. |

OTHER PUBLICATIONS

Kush P, "Top 5 Celebrity Look Alike Apps: Features + New App Ideas," webpage printed on Oct. 5, 2021, , Wayback Machine, Nov. 1, 2020, from: https://web.archive.org/web/20201101055701/https://echoinnovateit.com/celebrity-look-alike-app/, in 6 pages.

Reegan Von Wildenradt, "Want to Date a Celebrity? This App Helps You Find Single Lookalikes," dated Jul. 20, 2017, webpage printed on Oct. 5, 2021 from: https://www.menshealth.com/sex-women/a19526825/badoo-dating-app-celebrity-lookalikes/#:~:text=Badoo%20Lookalikes%20is%20a%20new%20feature%20just%20launched,Selena%20Gomez%2C%20Kim%20Kardashian%2C%20Beyonce%20and%20Kylie%20Jenner, in 4 pages.

* cited by examiner

SYSTEMS AND METHODS FOR MATCHING FACIAL IMAGES TO REFERENCE IMAGES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to object analysis using computer vision, and in particular, to methods and systems for facial matching.

Description of the Related Art

Facial matching has found many applications in security applications, photography, and social media. However, it is desirable to be able to achieve greater accuracy while reducing computer resource utilization.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a facial feature matching system comprising a facial feature matching engine. A first user selection of reference facial images is received, and facial features of reference faces are characterized using the facial feature recognition engine comprising a neural network. The facial features are weighted. The weighted facial features are used to identify users that have facial features similar to the weighted facial features, wherein the respective reference faces include faces different than the faces of the users. Similarity indicators are generated for the identified users. The generated respective similarity indicators are used to generate a ordering of the identified users which is rendered via the user device. A first user selection of a second user in the ordered identified users is received and the first user and the second user are enabled to communicate over an electronic communication channel.

An aspect of the present disclosure relates to a facial feature matching system, comprising: a network interface; at least one processing device operable to: populate a first user interface, for display on a user device associated with a first user, with a set of images comprising respective reference facial images of different people; receive, via the network interface, from the user device a selection by the first user of a plurality of reference facial images in the set of images; characterize a plurality of facial features of respective reference faces using a facial feature recognition engine, the respective faces comprising faces included in the reference facial images selected by the first user; apply respective weights to the plurality of facial features of respective reference faces; use the weighted plurality of facial features to identify a plurality of users that have one or more facial features similar to one or more of the weighted plurality of facial features, wherein the respective reference faces include faces different than the faces of the plurality of users; generate respective similarity scores for the identified plurality of users that have one or more facial features similar to one or more of the weighted plurality of facial features; use the generated respective similarity scores for the identified plurality of users that have one or more facial features similar to one or more of the weighted plurality of facial features to generate a ranking of the identified plurality of users; cause a second user interface to be displayed on the user device, the second user interface populated, in ranked order in association with respective similarity scores, with the identified plurality of users that have one or more facial features similar to one or more of the weighted plurality of facial features; receive, via the second user interface, a selection, by the first user, from the user device, of a second user in the plurality of users that have one or more facial features similar to one or more of the weighted plurality of facial features; and enable the first user and the second user to communicate over at least a first electronic communication channel.

An aspect of the present disclosure relates to a computerized method, the method comprising: populating, using a computer system comprising hardware, a first user interface, for display on a user device associated with a first user, with images comprising respective reference facial images of different people; receiving, at the computer system from the user device, a selection by the first user of a plurality of reference facial images; characterizing a plurality of facial features of respective reference faces using a facial feature recognition engine, the respective faces comprising faces included in the reference facial images selected by the first user; applying respective weights to the plurality of facial features of respective reference faces; using the weighted plurality of facial features to identify a plurality of users that have one or more facial features similar to one or more of the weighted plurality of facial features, wherein the respective reference faces include faces different than the faces of the plurality of users; generating respective similarity scores for the identified plurality of users that have one or more facial features similar to one or more of the weighted plurality of facial features; using the generated respective similarity scores for the identified plurality of users that have one or more facial features similar to one or more of the weighted plurality of facial features to generate a ranking of the identified plurality of users; causing a second user interface to be displayed on the user device, the second user interface populated, in ranked order, with the identified plurality of users that have one or more facial features similar to one or more of the weighted plurality of facial features; receiving, via the second user interface, a selection, by the first user, from the user device, of a second user in the plurality of users that have one or more facial features similar to one or more of the weighted plurality of facial features; and enabling the first user and the second user to communicate over at least a first electronic communication channel.

An aspect of the present disclosure relates to a non-transitory computer-readable medium comprising instructions that when executed by a processor, cause the processor to perform operations comprising: populating a first user interface, for display on a user device associated with a first user, with images comprising respective reference facial images of different people; receiving a selection by the first user of reference facial images; characterizing a plurality of facial features of respective reference faces using a facial feature recognition engine, the respective faces comprising faces included in the reference facial images selected by the first user; applying respective weights to the plurality of facial features of respective reference faces; using the weighted plurality of facial features to identify users that have one or more facial features similar to one or more of the weighted plurality of facial features, wherein the respective reference faces include faces different than the faces of the plurality of users; generating respective similarity indicators for the identified users that have one or more facial features similar to one or more of the weighted plurality of facial features; using the generated respective similarity indicators for the identified users that have one or more facial features similar to one or more of the weighted plurality of facial features to generate a ordering of the identified users; causing a second user interface to be displayed on the user device, the second user interface populated, in accordance with the ordering, with the identified plurality of users that have one or more facial features similar to one or more of the weighted plurality of facial features; receiving, via the second user interface, a selection, by the first user, from the user device, of a second user users that have one or more facial features similar to one or more of the weighted plurality of facial features; and enabling the first user and the second user to communicate over at least a first electronic communication channel.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
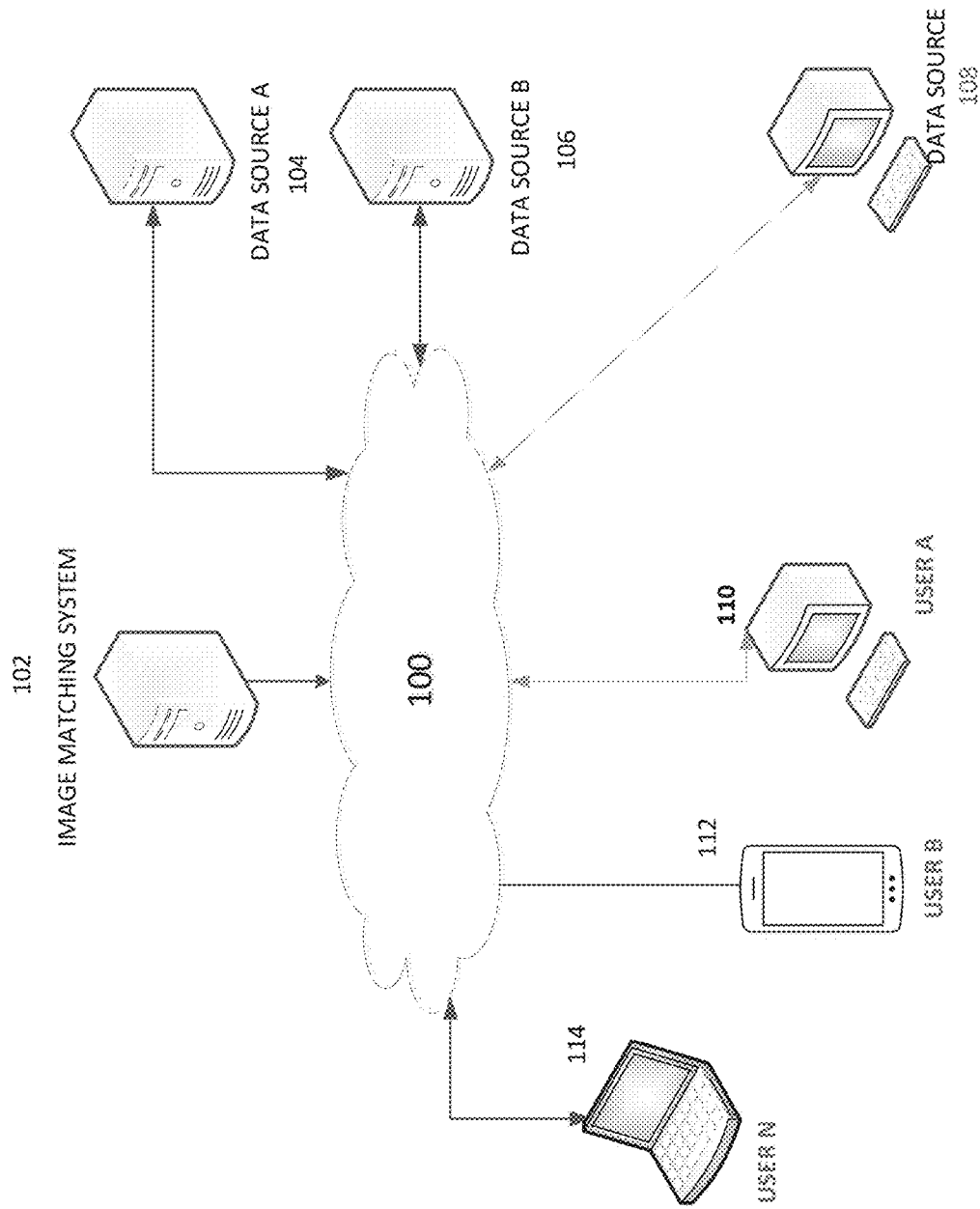
FIG. 1A illustrates an example networked environment.

An aspect of the present disclosure relates to systems and methods for identifying faces with similar facial features and/or other facial characteristics.

For example, facial recognition technology (FRT) herein may be configured and utilized to identify and/or match (with a certain threshold of similarity) a person or individual features of a person (e.g., identify images of people that have similar facial features) by comparing and analyzing patterns based on the person's facial contours or parts or individual features of the person's facial contours. Further, the disclosed facial recognition technology may be configured to identify head and facial hair (e.g., eyebrows, eyelashes, mustache, beard, sideburns, etc.) and/or identify two or more people with similar hair features.

As disclosed herein, an artificial intelligence (AI) engine (e.g., implemented as a biometric software application, a hardware device, and/or using a combination of hardware and software), may be utilized, where the artificial intelligence engine performs computer vision to analyze facial images and performs process to enhance or maximize the chance of identifying, for a given identified face, one or more matching (similar) faces in other facial images. The artificial intelligence engine may optionally be configured to mimic the cognitive functions of humans. Separate versions and/or parameters for each model for each user can be customized to optimize the matching process on a per user basis as described herein.

An aspect of this disclosure relates to utilizing facial recognition technology (including image processing and image recognition technologies) that identifies matching in advantageous combination with other technologies, fields, and functions. Although certain aspects of the disclosure relate to dating applications for the purpose of illustration, the disclosed systems and methods may similarly be utilized for non-dating applications (e.g., security applications, social events, social networking, and other potential use cases), including those where it may be advantageous to identify people using computer vision.

An enhanced method of utilizing facial recognition technology, optionally employing artificial intelligence, may be utilized in order to provide a matching system that identifies people with similar facial features in the dating field to thereby provide more satisfactory matches that conventional systems. The disclosed algorithms and systems utilize a novel filtering and matching technique with respect to information extracted from a facial recognition/facial feature characterization process. For example, a first user may identify a reference face that has pleasing characteristics to the first user. Using a matching algorithm that utilizes facial feature recognition technology, the disclosed systems and processes will attempt to find other users that have one or more matching characteristics with respect to the reference face. A given user may be matched to more than one reference person. The reference person may be, by way of example, a celebrity, or a famous face look-alike (e.g., a person with very similar physical attributes, often commonly referred to as a doppelganger). The users may be users (e.g., subscribers) of a dating service.

In order to train the system to identify facial features of a user, a training process may be utilized in which a user selects images of preferred faces from a group of digital images from a database of images (or provides reference images via an upload of facial images or links to facial images) of reference people's faces. This database may store a group of 2 to "n" reference images of reference people. The images may be tagged using an artificial intelligence computer vision system with various identified facial characteristics.

By way of non-limiting example, such characteristics may include face shape (e.g., oval, round, square, diamond, heart, pear, oblong, etc.), eyebrow shape (soft angled arched, hard angled arch, straight, rounded, s-shaped, etc.), eye shape (e.g., round, monolid, downturned, upturned, hooded, almond eyes), eye color (e.g., amber, blue, brown, gray, green, hazel, red, etc.), nose shape (e.g., Greek nose, Roman nose, Nubian nose, bulbous nose, fleshy nose, snub nose, hawk nose, etc.), lip shape (e.g., heavy upper lip, full lips, wide lips, round lips, heavy lower lip, thin lips, bow-shaped lips, heart-shaped lips, downturned lips, etc.), forehead shapes (e.g., broad, narrow, curved, slopped, etc.), hairline shapes (e.g., high and broad, low and narrow, straight and square, round, M-shaped, Widow's Peak, etc.), forehead lines (no lines, moderate lines, heavily lined), chin shape (e.g., double chin, dimpled shin, drooping chin, large chin, recessed chin, etc.), ear shape (e.g., attached lobes, broad ear, narrow ear, pointed ear, round lobe, square ear, protruding ears, etc.), hair (e.g., straight, curly, wavy, long, short, buzz cut, male pattern baldness, bald, etc.), hair color (e.g., black, brown, blonde, auburn, dirty blonde, red, etc.), facial hair (e.g., long, short, Van Dye, Royale, round, goatee, egg-shaped, 5 o'clock shadow, scruffy, etc.), and so on.

In order to enhance accuracy and reduce computer resource utilization, facial images presented to the user for selection are optionally prescreened and filtered for the user based on preliminary criteria, optionally including user preference information provided by the user via a preference user interface as well as preference information of potential matches. Advantageously, rather than reanalyzing the database of images using computer vision each time a filter operation is to be performed, a search engine may compare the user's preferences with tags assigned to the images corresponding to facial characteristics previously identified by using the computer vision artificial intelligence engine.

For example, prescreening and filtering may optionally be performed based in whole or in part on facial characteristics, gender, gender identity, and/or sexual preferences specified by the user. The user makes a selection from the group of filtered "n" images, to build a set of images from "x" to "z" images of reference people that the user would like to be matched to. The algorithm, utilizing a facial recognition engine and optionally artificial intelligence, along with a matching algorithm that utilizes image processing technology, then builds an optimal or selective combined set of image characteristics for future matching. For example, if a user indicates a preference for a person presenting as female, with almond shaped eyes, and a straight nose, the filtering process may filter out images of faces that do not include the foregoing preferences, and present a gallery of facial images that do meet the preferences.

Certain aspects will now be described with reference to the figures.

FIG. 1A illustrates an example networked environment that may be utilized to practice the example processes herein. An image processing system 102 may be used to enable a user to select and/or provide one or more reference facial images and find matching images of other users of the system (e.g., users who have similar facial and/or hair features as the reference image(s) as described herein.

The image processing system 102 may be coupled, via a network 100 (e.g., the Internet, an intranet, and/or a cellular network) to one or more data sources 104, 106, 108. Image data from one or more of the data sources 104, 106, 108 may be used to train a learning engine (such as a convolutional neural network) configured to match user facial images to reference facial images. The reference facial images may be presented to a user via a user interface presented on a user device. As discussed herein, the user may be able to select one or more preferred faces and/or disfavored faces via the user interface. The user reference image selections may be used to identify images of users (e.g., users looking for a date or friend) that have one or more similarities to the preferred faces and/or that lack one or more similarities to the disfavored faces. The user selections may be used to generate a scored and/or ranked set of matching user facial images, where the score and/or ranking indicates the closes or relative closeness of a given user image to the reference facial image(s).

The image processing system 102 may communicate with one or more user systems 110, 112, 114 (e.g., smart phones, tablet computers, laptop computers, desktop computers, game consoles, vehicle computers, and/or other computer systems). The user systems 110, 112, 114 may present certain user interfaces described herein. The user interfaces may be presented via a dedicated match application downloaded to the user system (e.g., a phone/tablet app downloaded from an application store) or via browser that accesses the user interfaces from a web server associated with the image processing system 102. The user interfaces described herein may enable a user to provide user match preferences, select reference images, provide user profile data, and view images of users that match user preferences and/or reference image selections via the image processing system 102.

Figure 1B:
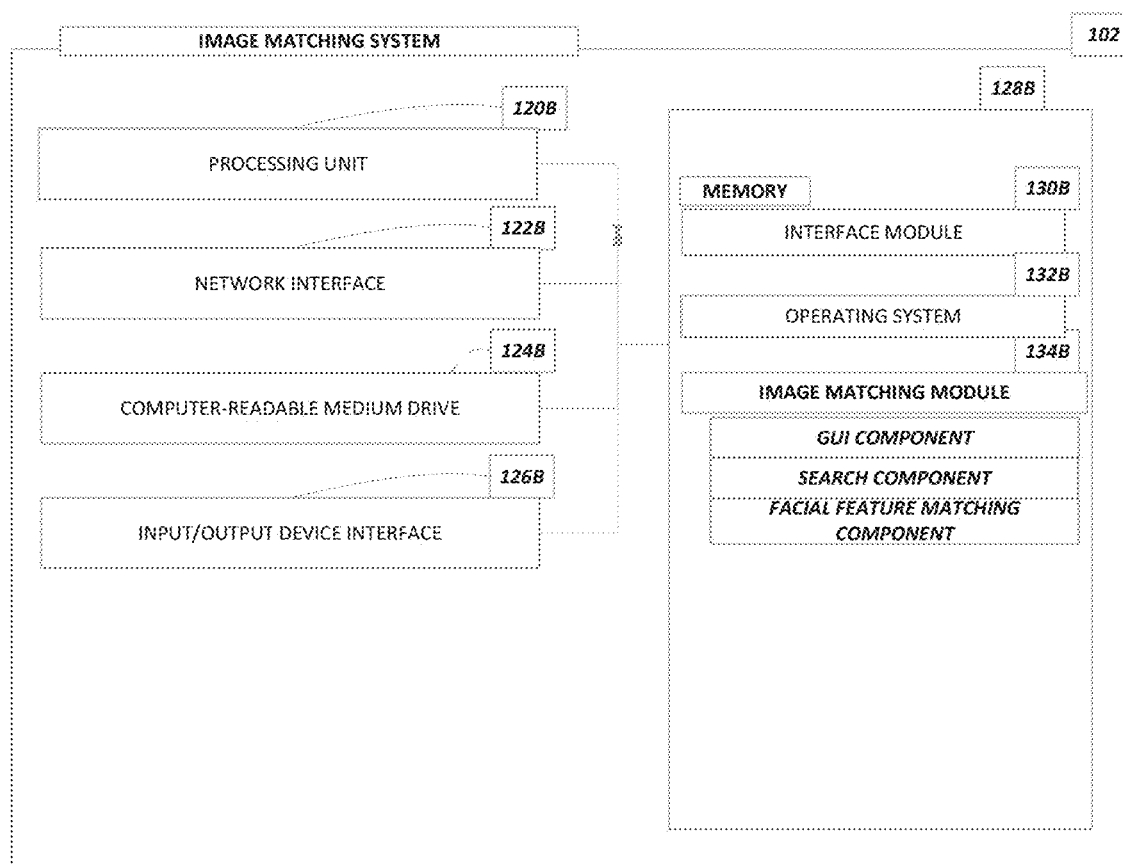
FIG. 1B illustrates an example architecture.
Figure 1C:
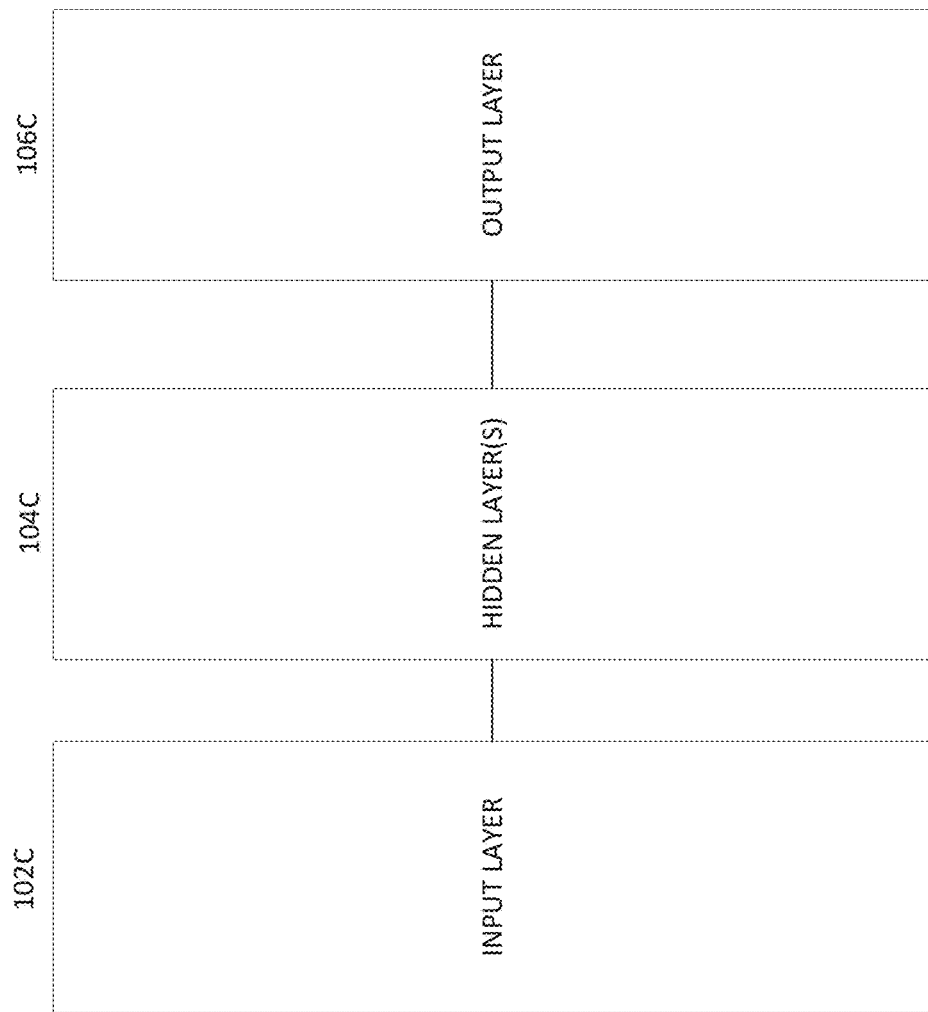
FIG. 1C illustrates an example neural network architecture.

FIG. 1B is a block diagram illustrating example components of the image processing system 102. The example image processing system 102 includes an arrangement of computer hardware and software components that may be used to implement aspects of the present disclosure. Those skilled in the art will appreciate that the example components may include more (or fewer) components than those depicted in FIG. 1B. image processing system 102 may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The image processing system 102 may include one or more processing units 120B (e.g., a general purpose processor and/or a high speed graphics processor), one or more network interfaces 122B, a non-transitory computer-readable medium drive 124B, and an input/output device interface 126B, all of which may communicate with one another by way of one or more communication buses. The network interface 124B may provide services described herein with connectivity to one or more networks or computing systems. The processing unit 120B may thus receive information (e.g., reference facial images, user images, user preferences, etc.) and instructions from other computing devices, systems, or services via a network. The processing unit 120B may also communicate to and from memory 12B4 and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 1208 may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of a image matching module 134B, including it components.

The memory 128B may store user accounts, including contact information, geographical location, user preferences (e.g., gender, sexual orientation, location, religion, height, weight, other preferences discussed herein, and/or the like), an identification of user selections of preference reference facial images, an identification of user selections of disfavored reference facial images, payment instrument data, and/or other user data described herein. The memory 128 may store facial images (e.g., still photographs or videos) that were captured by users and/or reference facial images. Some or all of the data discussed herein may optionally be stored in a relational database, an SQL database, a NOSQL database, or other database type. Because the assets may include BLOBs (binary large objects), such as large images, which are difficult for conventional database to handle, some (e.g., BLOBs) or all of the assets may be stored in files and corresponding references may be stored in the database. Optionally, the memory 128B may include one or more third party cloud-based storage systems.

The image matching module 134B may include a GUI component that generates graphical user interfaces and processes user inputs, a match search component (which may include a search engine used to search for facial images that match a user's preferences), and a facial feature matching component configured to perform facial feature matching as discussed herein.

The memory 128B may include an interface module 130B. The interface module 130B can be configured to facilitate generating one or more interfaces through which a compatible computing device may send to, or receive from, the image matching module 134B data and content.

Figure 2:
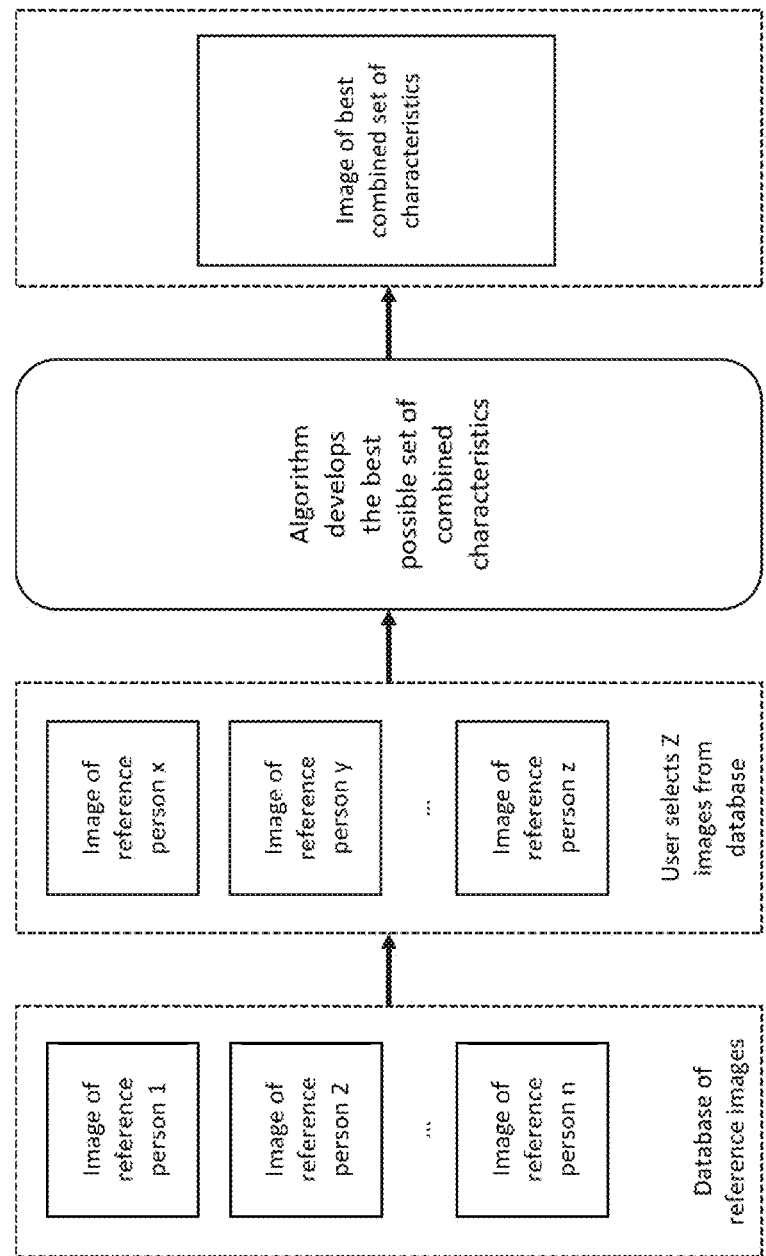
FIGS. 2 and 3 illustrate an example facial image matching process.
Figure 3:
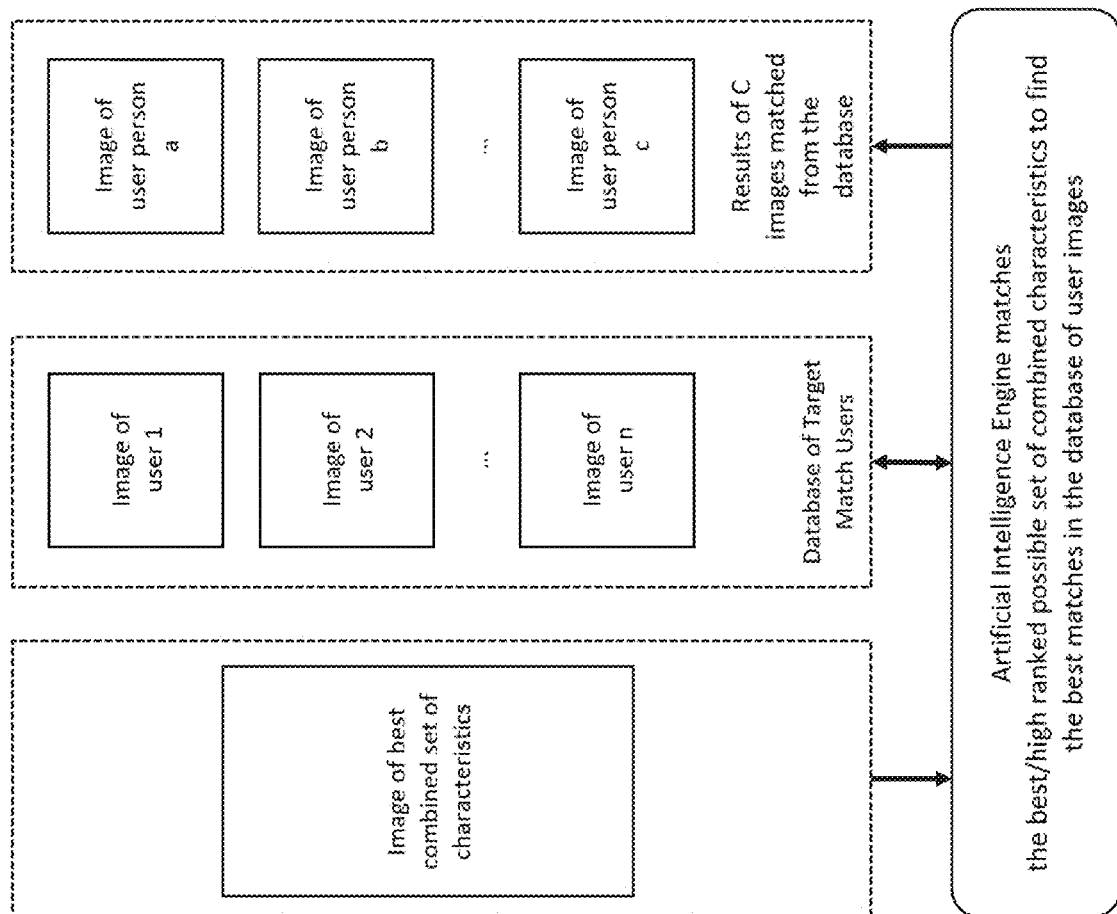

FIGS. 2 and 3 illustrate an example process configured to identify facial images of users having characteristics that most closely match those of one or more reference facial images.

The process may optionally be executed utilizing a cloud-based computing system comprising a facial recognition engine that communicates over a network with the user's endpoint. These endpoints can take many different forms, for example a mobile phone, laptop computer, desktop computer, networked television, gaming devices or consoles, or other electronic, computerized device.

With reference to FIG. 2, in order to build a database of facial images of users, a given user may provide a digital image of the user from the user device or a remote networked storage system (e.g., via an image upload to the system or by providing a link to the image to the system). The provided digital image may be stored in a database of users. With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

In order to perform a match process, the user may be presented with reference images of faces. The reference images may be selected to have a variety of different facial characteristics (e.g., different shaped eyes, different shaped noses, different shaped cheeks, different shaped chins, different hairlines, etc.). The user may select one or more of the facial reference images that the user finds attractive. Optionally, in addition or instead, the user may provide a reference image of a person the user finds attractive.

The facial recognition engine may draw a light mask of vectors of the facial features for the user to view. In this case, a vector mask may be placed on a portion of or the whole facial image of the digital image. Optionally separate vector masks may be generated based on individual or group(s) of individual facial features, using sets of different vector masks in the matching algorithms. Masks may be weighted, and the respective weights or actual masks also could be varied with separate weighting factors reflecting the relative importance of corresponding features. So weighting may be used to enhance the matching accuracy. Optionally, the user may provide one or more feature weights and/or may modify one or more default feature weights.

Referring again to FIG. 2, a matching user image algorithm may be utilized that takes the combined optimal set of image characteristics (e.g., as determined from the set up procedure) and matches the set of image characteristics against the database of user images in the user image database using the facial feature recognition engine, image processing technology, and optionally artificial intelligence as discussed elsewhere herein coupled with the matching algorithm to generate a list of "c" potential persons with a set of physical characteristics that satisfy the matching criteria based on the combined set of image characteristics. The matching process may be targeted and limited to the opposite or same sex of the user depending on the user requested gender category (e.g., where the user's target gender category may be determined via the user specified preferences which may be stored in a user profile).

The database of user images may optionally also be prescreened based on the user's preliminary criteria selection and preferences, for example, prescreened based on specific facial characteristics, hair characteristics, gender, gender identity, and/or sexual preferences. This prescreening process will reduce the amount of processing and memory resources required as the matching process will exclude some or all non-relevant images.

Referring to FIG. 3, an example version of the matching algorithm may be configured to extract images of individual or groups of facial features (e.g., as identified via the process illustrated in FIG. 2). The algorithm may then place the most significant weight on specific factors (e.g., the more relevant features for users or class of users (e.g., where the class may be of a particular gender, age, and/or geographical location) or for the particular user requesting a match), including features or groups of features, by ranking these factors, by placing different weights or ranking factors on specific items. Thus, the weighting and/or ranking may reflect the relative importance of a given feature (for users in general, users in a particular class, or for the particular user) in determining a match to thereby provide a more accurate match.

The matching engine that executes the matching algorithm optionally utilizes facial landmarks of key features, including the eyes, nose, and/or mouth that are detected and extracted. These landmarks may also be categorized with a mask of vectors for each feature that is automatically created using the mask. The matching algorithm provides the extraction of these features, the geometry of the face, and the topography of the base image to identify matches with similar images based on biometrics and image processing in the database of reference images. These features can then be utilized to match to the whole facial image.

With respect to the utilization of masks for feature extraction, a mask can be created for feature extraction of a group of reference images. A mask can be created for specific facial landmarks. Optionally, independent masks can be created for each facial feature (for example, right eye, left eye, nose, and mouth), which are then matched to features in the reference images.

One or more databases of male and female facial features may be provided, where the male facial features are identified as male features and the female facial features are identified as female features. Optionally, different databases may be used to store facial features of respective genders. Optionally, a single database may store facial features of more than one gender. These gender-based databases can also be sub-classified into other categories, including gender identity or sexuality, as well as in other types of categories.

The database of users optionally includes not only a digital image or images of each user but also includes a set of information about each user (e.g., profile information), including, by way of example, some or all of the following: the specific gender of the user, sexual preferences, and/or certain of the user's physical characteristics. A physical characteristic can include any physical feature of a person's body, such as a facial feature on a human (e.g., hair color, hair length, check prominence, lip shape, nose shape, other facial features described herein, etc.). This information may be stored as metadata with each image or as a separate file. This metadata can be utilized by the matching algorithm as part of the matching process. When the process identifies matching facial images in the database of user images, the facial images may be transmitted over a network to the user device for display via a user interface. The user interface may enable the user to select one or more than one images from the match results to indicate the person the user potentially wishes to be matched with.

The matching processes can optionally be trained to either include and or exclude (filter out) certain features based on individual users' preferences. Example factors may include image gender, rugged or femme looks, sexual orientation, height, weight, body shape, facial feature characteristics, hair characteristics, and/or other factors. Individual images can be recharacterized based on certain factors to reduce the facial recognition technology system processing power utilization and memory utilization, and the time needed to perform the matching process. As noted elsewhere herein, optionally a given user's facial features from an image may be characterized via a computer vision, and metadata corresponding to those facial features may be stored in association with the user's account and/or the user's image file. Such metadata may be used (e.g., by the matching processes which may compare the metadata to the user's preferences) to include or exclude certain users from the presentation of potential matches being presented to the user requesting a match.

The artificial intelligence engine (which may be used by the matching algorithm) can learn or be adjusted so that the prediction of the target user's match is more accurate based on the perceived "sexual chemistry" from the image. This may also be referred to as the user's biological type. The biological type could be based on the points derived from one or more technical sources, including by way of example, from anthropology, neurobiology, physiology, neuropsychology, and/or evolutional biology. These areas of science can be utilized to develop background information to be applied in establishing the baseline of the matching algorithm and in generating the matching algorithm.

In order to speed up the process of identifying for a user seeking other users (e.g., to date) and to correspondingly reduce computer resource utilization, the disclosed system may enable the user to pick "familiar" or celebrity faces (well-known faces the user may be familiar with) as reference images in the setup section that trigger biological responses (e.g., increase in heart rate, change in pupil dilation, etc.) and/or physical characteristics that can be described as "sexual chemistry," indicating that the faces are attractive to the user. The artificial intelligence engine may identify matches by characterizing and extracting data points from facial biometrics and then setting up categories of facial geometry and/or facial topography and other data points which were derived from the facial landscapes derived from the facial recognition technology analysis of the images (e.g., distance of various facial feature points from each other, the width of facial features, the height of facial features, etc.).

The identification and optionally measurements of these biological responses and/or characteristics can also be stored in the database for later access for use in other or future matching algorithms. The matching algorithm can organize and categorize within the database the facial biometric data into individual or groups of information for particular characteristics of groups or categories of images with similar individual or overall facial characteristics. The algorithm may optionally use different criteria depending on gender, other physical characteristics, or requested criteria. The algorithm may optionally examine neurological reactions (e.g., via one or more sensors, such as a camera, heart rate sensor, etc.) to certain images to establish or identify a physical response to certain types of images (e.g., faces having different facial characteristics) or that trigger the endorphins of the subject user.

The artificial intelligence engine may be used to extract, sort, group, classify, and/or characterize the images. The facial proportions and morphological features, and male and female images may optionally be categorized separately. The artificial intelligence engine algorithm optionally uses natural language processing (e.g., to analyze search user queries for desirable users) and/or deep learning interpretations from the inputs to the system. The artificial intelligence engine algorithm and/or image processing engine can learn the features that individual users or groups of users like/prefer and then store this data to evaluate and process new information for additional matches in the database over time. This way, the system can learn which individual facial features are more significant (with respect to user preferences) to which users or groups of users. Such engine learning may optionally also be based on data from anthropology, neurobiology, physiology, neuropsychology, and/or evolutional biology programmed into the system. The system can also modify the percentages of the matching factors required to provide a match based on historical data and anthropology, neurobiology, physiology, neuropsychology, and/or evolutional biology, to more accurately calculate a match score (e.g., a percentage match score) that may be provided to users.

Optionally, a different programed matching percentage may be utilized for a given user that is calculated using established data (e.g., based on historical data for a large number of people, such as more than a thousand people) and then modified using individual user data to refine the matching process for that user. For example, the artificial intelligence algorithm executed by the artificial intelligence engine may learn and modify the match percentage calculation for each individual user over time, and so a custom model may be generated for each user configured to perform a customized match in substantially real time. Optionally, the artificial intelligence engine may read the biometric data over time and, using the biometric data, learn how each user likes and dislikes or how each user values specific facial feature characteristics.

For example, the system's artificial intelligence engine may be configured to learn what the user likes/prefers based on the biometric data (e.g., facial features, hair features, etc.) that the user selects and may be configured to assign different weighted values to different facial feature characteristics as it learns. The system adjusts the percentages in the matching algorithm based on the features (e.g., to head shape, nose bridge length, chin shape, distance between the eyes, nose shape, skin color or tint, skin texture, distance from top of the nose to top of lip, distance from bottom of lip to chin, height of cheekbones, scars, eyebrow thickness and/or shape, jawline, nose shape, ear size and angle, and/or the like) that are more important to that individual user (e.g., including selected common features or groups of features). This algorithm may then tune the optimal individual percentages for each item for each individual user.

The selection of a group of reference images by a user over time (e.g., each time the user is prompted to select one or more reference images and the user accordingly makes such selection) may be utilized by the artificial intelligence engine as part of its learning process. The artificial intelligence engine may learn the common features of the user's changing selections of reference images within the system. The artificial intelligence engine algorithm may continuously store such data as the user adds or changes the selected reference images over time. The system learns how the user's desired reference features change over time based on the user's image selection history.

The facial biometrics may be classified, optionally in conjunction with the use of topography systems that analyze and classify facial features. The facial features can be encoded based on the geometry of the specific features and then used to carry out a matching or morphological assessment. The geometry of each feature can be determined by performing a morphological assessment on that particular feature. The facial geometry in an image may be measured and then the subclassification of individual features may be performed by conducting a morphological assessment of those morphological features (an analysis and assessment of form and structure of faces).

The facial topography, including facial features, may be categorized by individual facial features. Some examples of these facial features may include but are not limited to some or all of the following: head shape, nose bridge length, chin shape, distance between the eyes, nose shape, skin color or tint, skin texture, distance from top of the nose to top of lip, distance from bottom of lip to chin, height of cheekbones, scars, eyebrow thickness and/or shape, jawline, nose shape, ear size and angle, hairline, facial hair, other facial features described herein, or any combination of these and other facial features. The disclosed algorithms can also utilize an individual training process to fit these models for individual users.

Optionally, algorithms may be configured and utilized that place varying degrees of weights and/or rankings on individual or categories of different facial features or groups of facial features. Optionally, a process of chain code matching features may be performed which matches specific features and groups of features in a specific order and/or sequence. Advantageously, chain codes provide a compact representation of a binary object, and it is easier to compare objects (e.g., facial features) using chain codes as they are a translation invariant representation of a binary object. Additionally, chain codes can be used to compute any shape feature as it is a complete or satisfactory representation of an object or curve. Yet further, chain codes provide lossless compression and preserve all topological and morphological information which will be useful in the analysis of line patterns in terms of speed and effectiveness Optionally, facial recognition technology may be utilized that enables the system to collect and organize the aggregated data of a group of images to provide either a reference image and/or match user images to a set of standard reference images and/or to a reference image that was produced by the system. The aggregated data may represent an image of an actual person that is generated from this data set or rather than representing an actual person, but rather the reference image may be a hypothetical image that is generated using a combination of features from images of multiple different people.

Optionally, the matching algorithm may determine a match and/or a degree of match based on degrees of resemblance to make the match to either reference images or the user images more specific and, in some cases, qualitative in one or multiple characteristics. Therefore, matches do not need to be based on a direct match, one to one with a person to an image. Matches can be based in whole or in part on degrees of the resemblance or degrees of resemblance in just some specific individual facial features. Indeed, there may not be an exact match as there may not be users whose facial features completely match the reference images or other user-provided or inferred preferences, yet the closest matches may be determined.

Thus, by way of example, the matching process may automatically classify the "match" to reference images in varying degrees (e.g., percentages) of resemblance (e.g., ranging from 50% to 99%) or in terms of a grade (e.g., A, B, C) or other score. When classifying the match in a range (e.g., a range of 50% to 99%) multiple images can be respectively organized into subsets of matches. These subsets could range from a few images (e.g., 5-10 facial images) or a large number of facial images (e.g., 25-100 images or hundreds of images). The subset may be created to include those images that are the closest in appearance (e.g., satisfy a threshold minimum resemblance percentage or other score) as may be determined based on ranking factors and/or weights using the matching algorithms in ranked order.

The ranking factors and weights can be based on similarities or differences, symmetry, feature size, and/or any other characteristics of the individual features or group of features. The ranking factors and weights may be based at least partly on scientific principles of human attraction or other data. Examples could include the size of lips, eyes, cheekbone height, and/or other features or groups of features. The algorithm can be trained to the preferences of the individual users (e.g., to decide if the size of a physical feature would have a higher or lower weighted value than the color of a person's hair or vice versa).

The matching processes may also utilize artificial intelligence (AI) engines to improve the accuracy of the overall process. With reference to FIG. 10, an artificial intelligence engine may include a deep convolutional neural network (including an input layer, hidden layers, and an output layer) to analyze the images. Fully convolutional neural networks can be used and trained based on the individual user's feedback (where neural network layer node weights may be adjusted using backpropagation based on an error function output).

Optionally, a "Selfie Booth" module may be provided that controls and restricts the digital image(s) capture process (e.g., using a camera on a user device, such as a rear or front facing phone camera or a laptop or desktop video camera), using many different potential physical sources for the input to the image(s) capture system, that are generated for the user's digital image(s) in the database. The system may create restrictions on the image capture process to ensure that the image source is current and from the actual user. The system may enable a collection of user images to be provided by the user (including upload or referenced images from the Internet or third party database) and/or other digital image sources to be accessed. These images may be stored in the database as the verified reference images for the user as described elsewhere herein.

The disclosed systems and methods may be configured to provide multiple matches to a given reference image. This may be accomplished by providing matches with degrees of similarity or resemblance in one or more of the methods or criteria.

These simultaneous multiple matches may optionally be performed using parallel processing and/or parallel processing with the artificial intelligence technology to spread the processing requirements out over different computational units (e.g., processing devices). Optionally, a task allocation hardware and/or software module may identify the loading level of a given processing device and allocate matching processes so as to attempt to balance the loads of the various processing devices.

Figure 4:
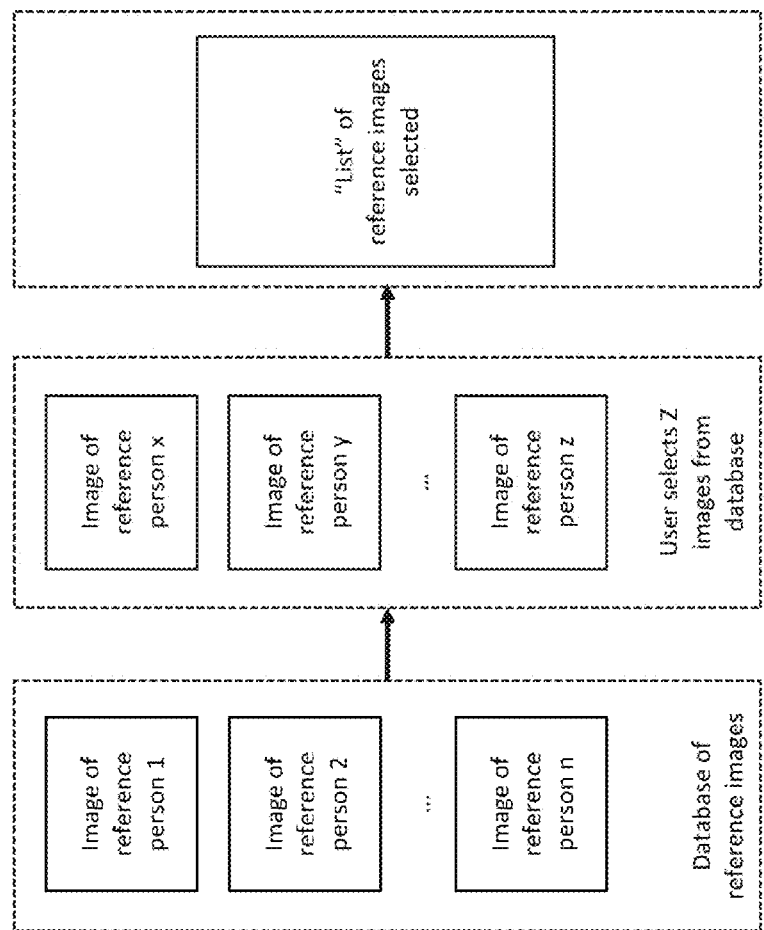
FIGS. 4 and 5 illustrate another example facial image matching process.
Figure 5:
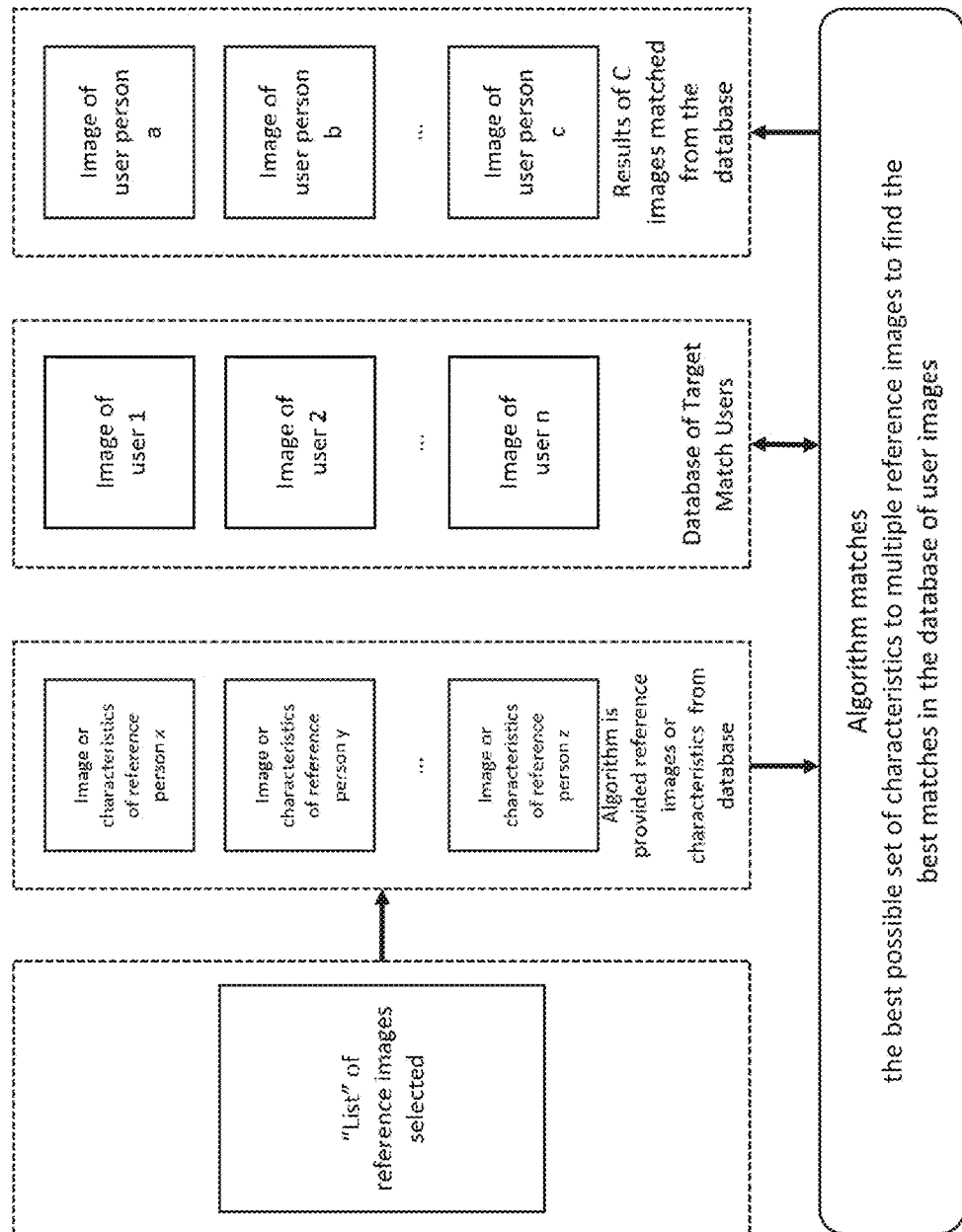

Referring now to FIGS. 4 and 5, as similarly discussed above, a setup system (comprising setup processes) and corresponding user interfaces may be provided in which the user selects from a group of more than one digital image from a database of images of reference people populated by the system, where the user may be instructed to select images of preferred faces or disfavored images. This database can be comprised of a group of 2 to "n" reference images of reference people. These images are optionally prescreened for the user based on preliminary criteria (e.g., user preferences accessed from a user profile), for example, prescreened based on gender, gender identity, and/or sexual preferences (e.g., as provided by the user and stored in a user profile). The user selects images from the group of "n" images, to build a set of images ("x" to "z" images) of people that the user would like to be matched to. In this form, a list (or tags or pointers or the actual images) of the user's individual selection of a set of reference images is stored for later processing. Optionally, the user may also select images of faces that the user finds unattractive to enable the system to exclude images of faces with disfavored features as being a potential match. Thus, for example, each image may be presented with a like control and a not interested control. The user may activate the appropriate control which will be detected and recorded by the system, and used to train the system to identify facial features the user finds attractive or unattractive.

A matching user image algorithm may be utilized that takes the list or set of reference images and/or characteristics.

The characteristics or features may include any that were generated. Referring to FIGS. 4 and 5, the process matches the characteristics or features against the database of user images using facial recognition (e.g., facial feature recognition), and optionally artificial intelligence, coupled with the matching algorithm to generate a list of "c" potential persons determined to have a good set of physical matching characteristics (e.g., as determined by calculated matching scores that exceed a specified threshold) to the combined set of image characteristics. This matching process may be limited to the opposite and/or the same sex of the user depending on the user requested gender category/profile and/or other user preferences. The database of user images may also be prescreened based on the user's preliminary criteria selection, for example, prescreened based on gender, gender identity, and/or sexual preferences.

Thus, the persons included in the list of potential persons determined to have a good set of physical matching facial characteristics may be scored based at least in part on the closeness of the match (e.g., a percentage similarity score, a number score in a score range (e.g., 1-100, 1-10, 1-5, etc.), a textual description score (e.g., "best match", great match", "good match", etc.), and/or other score). Optionally, an additional score may be provided reflecting the closeness of the match between non-facial characteristics to a user's other preferences (e.g., gender, age, locality, religion, musical interests, hobbies, education level, etc.). Optionally, an aggregate score may be generated that reflects both the closeness of the match of facial characteristics and the closeness of the match of non-facial characteristics.

A ranked list of the potential persons may be displayed in association with respective similarity scores on the user's device. The user may select one or more of the potential persons to communicate with. The system may enable the user to communicate with selected potential persons via one or more communication channels (e.g., text chat, audio chat, audio/video chat, email, and/or the like). Optionally, a give selected person may first receive a message from the system indicating that the user wants to communicate with the person. The message may include an image of the user and user profile information (e.g., geographical location, age, hobbies, musical interests, etc.). Optionally, the person may need to agree to receive a communication from the user (e.g., by activating an accept control in the message) prior to the system enabling the user to communicate with the selected person.

A user's digital image can be screened for quality and accuracy. The screening process further enables the determination as to how old the image representation is of the user (e.g., based on the timestamp or verification date data associated with the image), such as information extracted from the image or metadata attached to the image. As similarly described above, the "Selfie-booth" technology may use facial recognition to match a verified real-time image to established reference image(s) of the user. The real-time image can be verified by using a reference clock coupled with a required current reference image feature in the image. One example of the reference image would be a digital image of a government-issued identification like a driver's license or a verified on-line image on established social media profile(s). Another example might be a current newspaper in the image frame. The real-time image could include a real-time image capture function from a mobile device or web-camera. Optionally, the real-time device status may be utilized to verify the image recording time, but not the identity of the user, which might be verified separately. Images of a user that are not verified or that are older than a threshold period of time may be excluded from being used matching processes with other users To enable faster system processing, the systems and processes described herein may be configured to simultaneously search for more than one subject in a single subject search query. The systems and processes described herein may enable the simultaneous matching of more than one user based on different methods or criteria from a single search or to match to multiple reference images. This enables a user to match several different facial images in one search query, thereby providing simultaneous results to the user in response to a single search query. Any of these criteria may be encrypted to prevent the user from performing any modifications on the system.

An example advantage over conventional image-matching technology (which can yield zero/no match results), the disclosed matching algorithm may optionally be configured to always yield matches based on providing varying degrees of similarity and/or based on different features or image criteria. In contrast to a conventional image-matching technology which can yield zero results, optimally the matching algorithm disclosed will always yield some matches as long as there are images of one or more other users in the user image database. These matches can be provided in rank order and optionally in association with a match score (e.g., a percentage match, a letter grade match, a numerical match score in a range of 1 to 5 or 1 to 10, etc.) reflecting the closeness of match.

The degrees of the resemblance of individual matches from the system may also be provided for display to the user. The resemblance measurement may be an aggregate metric and/or a group of individual metrics. For example, the user might be shown images based on a single or a group of facial criteria or features.

The system architecture may be utilized irrespective of the intended application or market. For example, the reference imaging matching portion of the system using facial image recognition technology may be matched to a reference image (including but not limited to a celebrity) as follows.

A single individual user image may, in a single search, be matched to multiple reference images with the disclosed facial image recognition technology and optionally using the disclosed artificial intelligence engine. Providing the user's facial landscape, image, or image characteristics with the degree of resemblance to the reference image landscape, images, or image characteristics. This includes providing the user image with a degree of resemblance to multiple reference images, providing more than just reference image matching, and more than one percentage of resemblance calculation based on a single matching query. This optionally includes simultaneously matching multiple user images to multiple reference images within multiple degrees of resemblance by providing these results from a single query. Optionally, this may include matching one user with different reference images in the database and/or matching in degrees of resemblance and/or also allowing running multiple searches on multiple subjects from the same query.

An example process may include uploading the image of one user person, adding multiple images of reference people to find the best matches, process the images, match the data to the data, stored in a database, of other users, rank and display the results.

The disclosed systems and methods optionally enable multiple terms to be simultaneously searched and enable multiple matching processes (where multiple searches are performed to identify matches) to be performed in parallel (e.g., where the parallel searches may optionally be based on searching for several matching criteria).

The disclosed systems and methods may be utilized for a variety of applications outside of the dating field. Thus, while certain of the described examples relate to dating application systems and methodologies, the disclosed techniques may be used for other purposes as well. These include security applications, social events, social networking and other potential use cases.

The disclosed systems and methods may be utilized in applications in which, in response to a single matching query request, an image of a familiar face or a celebrity facial image is matched using facial recognition technology (e.g., feature recognition and characterization) to one person (the subject person) by matching to multiple familiar or celebrity images using facial recognition and optionally using artificial intelligence algorithm(s).

The disclosed facial recognition technology may be implemented via software, such as a biometric software application, a hardware device, and/or using a combination of hardware and software.

The disclosed processes may be performed in whole or in part by a user device, a local system, and/or a cloud-based system. For example, some or all of a given disclosed process may be executed by a secure, cloud based system comprised of co-located and/or geographically distributed server systems (which may include cloud-based GPU systems). Information may be received by the cloud-based system from one or more terminals. A terminal may include or be connected (via a wireless or wired connection) to one or more sensors, such as one or more microphones, one or more cameras (e.g., front facing and/or rear facing cameras, and/or the like.

A terminal may include a display, a wired network interface, a wireless local network interface and/or wireless cellular interface.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A facial feature matching system, comprising:
   a network interface;
   at least one processing device operable to:
   populate a first user interface, for display on a user device associated with a first user, with a set of images comprising respective reference facial images of different people;
   receive, via the network interface, from the user device a selection by the first user of a plurality of reference facial images in the set of images;
   characterize a plurality of facial features of respective reference faces using a facial feature recognition engine, the respective faces comprising faces included in the reference facial images selected by the first user;
   use the characterized plurality of facial features to identify a plurality of users that have one or more facial features similar to one or more of the characterized plurality of facial features, wherein the respective reference faces include faces different than faces of the plurality of users;

generate respective similarity indicators for the identified plurality of users that have one or more facial features similar to one or more of the characterized plurality of facial features;

use the generated respective similarity indicators for the identified plurality of users that have one or more facial features similar to one or more of the characterized plurality of facial features to generate a ranking of the identified plurality of users;

cause a second user interface to be displayed on the user device, the second user interface populated, based at least in part on the generated ranking of the identified plurality of users, in association with respective similarity indicators, with the identified plurality of users that have one or more facial features similar to one or more of the characterized plurality of facial features;

receive, via the second user interface, a selection, by the first user, from the user device, of a second user in the plurality of users that have one or more facial features similar to one or more of the characterized plurality of facial features; and enable the first user and the second user to communicate over at least a first electronic communication channel.

2. The facial feature matching system as defined in claim 1, the system further configured to perform operation comprising:

filtering reference images in a database of reference images to generate the set of images comprising respective reference facial images based at least in part on non-appearance-related preferences.

3. The facial feature matching system as defined in claim 1, the system further configured to perform operations comprising:

using a neural network comprising:
an input layer,
one or more hidden layers, and
an output layer,
to identify the plurality of users that have one or more facial features similar to the one or more of the characterized plurality of facial features.

4. The facial feature matching system as defined in claim 1, the system further configured to perform operations comprising:

receiving an image from a given user;
verifying timing information associated with the image of the given user; and
at least partly in response to a successful verification of timing information associated with the image received from the given user, including the image received from the given user in a first database comprising user images.

5. The facial feature matching system as defined in claim 1, the system further configured to perform operations comprising:

drawing respective light masks of vectors for respective facial features of a given face in at least one image; and
weighting the respective light masks to enhance accuracy in identifying facial feature similarity.

6. The facial feature matching system as defined in claim 1, the system further configured to perform operations comprising: using a chain code in performing a process of matching a feature of a given reference face with a feature of a given user.

7. The facial feature matching system as defined in claim 1, wherein a given similarity indicator comprises a percentage similarity indicator.

8. A computerized method, the method comprising:

populating, using a computer system comprising hardware, a first user interface, for display on a user device associated with a first user, with images comprising respective reference facial images of different people;

receiving, at the computer system from the user device, a selection by the first user of a plurality of reference facial images;

characterizing a plurality of facial features of respective reference faces using a facial feature recognition engine, the respective faces comprising faces included in the reference facial images selected by the first user;

using the characterized plurality of facial features to identify a plurality of users that have one or more facial features similar to one or more of the characterized plurality of facial features, wherein the respective reference faces include faces different than faces of the plurality of users;

generating respective similarity indicators for the identified plurality of users that have one or more facial features similar to one or more of the characterized plurality of facial features;

using the generated respective similarity indicators for the identified plurality of users that have one or more facial features similar to one or more of the characterized plurality of facial features to generate a ranking of the identified plurality of users;

causing a second user interface to be displayed on the user device, the second user interface populated, based at least in part on the generated ranking of the identified plurality of users, with at least a portion of the identified plurality of users that have one or more facial features similar to one or more of the characterized plurality of facial features;

receiving, via the second user interface, a selection, by the first user, from the user device, of a second user in the plurality of users that have one or more facial features similar to one or more of the characterized plurality of facial features; and enabling the first user and the second user to communicate over at least a first electronic communication channel.

9. The computerized method as defined in claim 8, the method further comprising:

filtering reference images in a database of reference images to generate the images comprising respective reference facial images based at least in part on non-appearance-related preferences.

10. The computerized method as defined in claim 8, the method further comprising:

using a neural network comprising:
an input layer,
one or more hidden layers, and
an output layer,
to identify the plurality of users that have one or more facial features similar to the one or more of the characterized plurality of facial features.

11. The computerized method as defined in claim 8, the method further comprising:

receiving an image from a given user;
verifying timing information associated with the image received from the given user; and at least partly in response to a successful verification of timing information associated with the image received from the given user, including the image received from the given user in a first database comprising user images.

12. The computerized method as defined in claim 8, the method further comprising:
drawing respective light masks of vectors for respective facial features of a given face in at least one image; and
weighting the respective light masks to enhance accuracy in identifying facial feature similarity.

13. The computerized method as defined in claim 8, the method further comprising: using a chain code in performing a process of matching a feature of a given reference face with a feature of a given user.

14. The computerized method as defined in claim 8, wherein a given similarity indicator comprises a percentage similarity indicator.

15. A non-transitory computer-readable medium comprising instructions that when executed by a processor, cause the processor to perform operations comprising:
populating a first user interface, for display on a user device associated with a first user, with images comprising respective reference facial images of different people;
receiving a selection by the first user of one or more reference facial images;
characterizing a plurality of facial features of respective reference faces in the one or more reference facial images using a facial feature recognition engine, the one or more respective faces comprising faces included in the reference facial images selected by the first user;
using the characterized plurality of facial features to identify users that have one or more facial features similar to one or more of the characterized plurality of facial features, wherein the respective reference faces include faces different than faces of the identified users;
generating respective similarity indicators for the identified users that have one or more facial features similar to the one or more of the characterized plurality of facial features;
using the generated respective similarity indicators for the identified users that have one or more facial features similar to the one or more of the characterized plurality of facial features in generating an ordering of the identified users;
causing a second user interface to be displayed on the user device, the second user interface populated, in accordance with the ordering, with the identified users that have one or more facial features similar to the one or more of the characterized plurality of facial features;
receiving, via the second user interface, a selection, by the first user, from the user device, of a second user users that have one or more facial features similar to the one or more of the characterized plurality of facial features; and
enabling the first user and the second user to communicate over at least a first electronic communication channel.

16. The non-transitory computer-readable medium as defined in claim 15, the operations further comprising:
filtering reference images in a database of reference images to generate the images comprising respective reference facial images based at least in part on non-appearance-related preferences.

17. The non-transitory computer-readable medium as defined in claim 15, the operations further comprising:
using a neural network comprising:
an input layer,
one or more hidden layers, and
an output layer,
to identify the users that have one or more facial features similar to the one or more of the characterized plurality of facial features.

18. The non-transitory computer-readable medium as defined in claim 15, the operations further comprising:
receiving an image from a given user;
verifying timing information associated with the image from the given user; and
at least partly in response to a successful verification of timing information associated with the image from the given user, including the image of the given user in a first database comprising user images.

19. The non-transitory computer-readable medium as defined in claim 15, the operations further comprising:
drawing respective light masks of vectors for respective facial features of a given face in at least one image; and
weighting the respective light masks to enhance accuracy in identifying facial feature similarity.

20. The non-transitory computer-readable medium as defined in claim 15, the operations further comprising: using a chain code in performing a process of matching a feature of a given reference face with a feature of a given user.

21. The non-transitory computer-readable medium as defined in claim 15, wherein a given similarity indicator comprises a percentage similarity indicator.

\* \* \* \* \*